United States Patent [19]
Elms

[11] 3,733,541
[45] May 15, 1973

[54] RECTIFIER OPERABLE FROM DUAL INPUT VOLTAGES FOR USE WITH BALLASTED DISCHARGE LAMPS

[75] Inventor: Robert T. Elms, Pittsburgh, Pa.

[73] Assignee: Westinghouse Electric Corporation, Pittsburgh, Pa.

[22] Filed: June 15, 1972

[21] Appl. No.: 263,040

[52] U.S. Cl. .............321/47, 315/205, 315/268, 315/283, 315/349
[51] Int. Cl. ...........................................H05b 41/26
[58] Field of Search................315/205, 237, 268, 315/272, 283, 311, 349; 321/47

[56] References Cited

UNITED STATES PATENTS 3,233,148 2/1966 Lake.................................315/205 X
3,603,865 9/1971 Liebenthal........................321/47

*Primary Examiner*—A. D. Pellinen
*Attorney*—A. T. Stratton et al.

[57] ABSTRACT

A dual-voltage-input, three-terminal-output, rectifier for use with a two-transistor, air-core transformer feedback inverter for supplying high frequency to ballasted discharge lamps. Four diodes are used. Depending on the input voltage, the diodes are, by means of a disconnectable conductor, connected either in a full-wave bridge, or as two sets of parallel diodes. The diodes feed two capacitors connected in series, and the common point between the capacitors provides the third output terminal and is available for an input connection at the lower of the dual input voltages.

3 Claims, 4 Drawing Figures

3,733,541

RECTIFIER OPERABLE FROM DUAL INPUT VOLTAGES FOR USE WITH BALLASTED DISCHARGE LAMPS

CROSS REFERENCE TO RELATED APPLICATION

In copending application Ser. No. 263,041, filed concurrently herewith, by Joseph C. Engel and Robert T. Elms, and owned by the present assignee, is disclosed a low cost circuit arrangement for the operation of ballasted discharge lamps utilizing a rectifier and a two-transistor, air-core transformer feedback inverter to provide high-frequency power for the lamps from a relatively low frequency power source. The present rectifier circuit arrangement can be used in the circuit arrangement as disclosed in this copending application.

BACKGROUND OF THE INVENTION

The standard commercial lighting discharge devices, such as the fluorescent lamp and the high pressure mercury vapor lamp, are characterized as negative resistance devices and, as such, require some type of ballasting. In practice, ballasting devices for such lamps have generally consisted of relatively heavy and expensive inductive devices. It has been recognized that the use of high frequency for such discharge lamps would reduce the weight and cost of these ballasting devices, and would also improve the efficiency of the lamp itself. Difficulties have been encountered, however, in obtaining an inexpensive rectifier-inverter combination to supply such high frequency. Such a rectifier-inverter arrangement can be expensive, and, unless the frequency of such an arrangement is above the audible range, the system can give off objectionable noise.

One relatively inexpensive inverter arrangement is provided by the two-transistor inverter. Typically, however, such an inverter has a center tapped transformer output. While these center-tapped-output transformer arrangements can easily be run from a conventional two-terminal-output rectifier, the inverter's output transformer is heavy and expensive and generally limits the maximum output frequency to the audible region. These difficulties are circumvented by the disclosure in copending application Ser. No. 263,041, cross-referenced hereinbefore, but the circuit arrangement provided is adaptable to be connected only to a single, predetermined voltage. It is quite desirable that the ballasted discharge lamp system be operable from more than one voltage, for example either 110 volts or 220 volts. In other systems, dual-voltage input has usually been accomplished by providing an input transformer whose windings are connectible for either of the supply voltages. Such transformers are, of course, relatively heavy and expensive.

SUMMARY OF THE INVENTION

The present invention is of a rectifier circuit arrangement which, in combination with a high frequency two-transistor inverter which incorporates an air-core transformer feedback, provides for operation from either a low-voltage or a high-voltage power source. The rectifier-inverter combination provides high-frequency excitation to a load comprising ballasted discharge lamps.

The two-transistor inverter has the two input leads and one output lead, the output lead being connected to one of the two input leads of the load. The rectifier circuit arrangement has three output terminals, two of which are connected to the input leads of the two-transistor inverter, and the third lead which is attached to the outer input lead of the load.

The rectifier circuit arrangement comprises four diodes, two capacitors, two power input terminals, a disconnectable electrical conductor, and a common terminal. The disconnectable electrical conductor and the common and input terminals are adapted to be connected in one or two arrangements;

i. when the rectifier is operated from the low-voltage power source, one line of the low-voltage power source is electrically connected to the common terminal and the other line of the low-voltage power source is electrically connected to the first power input terminal and the second power input terminal, which power input terminals are connected together by the disconnectable electrical conductor; or ii. when the rectifier is operated from the high-voltage power source, the first power input terminal is electrically connected to one line of the high-voltage power source and the second power input terminal is electrically connected to the other line of the high-voltage power source, and the disconnectable electrical connector is disconnected.

An inductive inrush limiter is preferably used to inhibit the current inrush when the circuit is initially connected and the capacitors are uncharged, as otherwise diodes would, for a period of time, be subjected to full load voltage with virtually no series impedance.

BRIEF DESCRIPTION OF THE DRAWING

The invention can be best understood by reference to the exemplary embodiment illustrated in the following.

DESCRIPTION OF THE PREFERRED EMBODIMENTS

Figure 1:
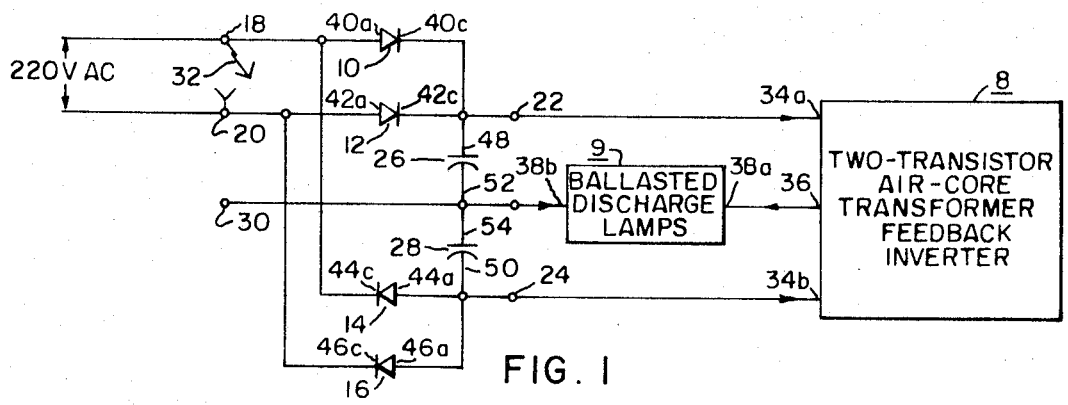
FIG. 1 shows the basic parts of the rectifier circuit arrangement and the connections to the inverter and the ballasted discharge lamps.

With reference to FIG. 1, there is shown the basic parts of the rectifier circuit arrangement having three-terminal DC outputs used in combination with a high frequency two-transistor, air-core transformer feedback inverter 8. The rectifier-inverter combination is used to provide high-frequency excitation to a load, which comprises ballasted discharge lamps 9, from either a low-voltage or a high-voltage power source. When the high-voltage power source is to be used, the first diode 10, the second diode 12, the third diode 14, and the fourth diode 16 are connected in a full-wave bridge arrangement between the first power input terminal 18 and the second power input terminal 20, and provides full-wave rectified power between the positive output terminal 22 and the negative output terminal 24. The first capacitor 26 and the second capacitor 28 are connected in series between the positive output terminal 22 and the negative output terminal 24 and the common point between the two capacitors is connected to the common terminal 30. The disconnectable electrical conductor 32 is disconnected for this high-voltage power source.

When a low-voltage power source is used, the disconnectable electrical conductor 32 is connected between the first power input terminal 18 and the second power input terminal 20, and the low-voltage power source is connected with one line of the low-voltage power source to the common terminal 30 and the other line of the low-voltage power source to the first power input terminal 18 and the second power input terminal 20, which power input terminals are directly electrically connected together by the disconnectable electrical connector 32. When this low-voltage power source is used with a given load, twice the current is drawn from the power source, and is conveniently handled by the now parallel connection of the first diode 10 and the second diode 12, and the parallel connection of the third diode 14 and the fourth diode 16. This allows full utilization of the current capacity of the diodes in both configurations. The voltage across the first capacitor 26 and a second capacitor 28 are the same with either voltage power source, and 200 volt capacitors can be used, for example, with either a 110 volt low-voltage power source of a 220 volt high-voltage power source.

The two-transistor inverter 8 has a first input lead 34a and a second input lead lead 34b and one output lead 36, the output lead 36 being connected to a first load input lead 38a. The rectifier circuit arrangement has three output terminals 22, 24, 30, two of which are connected to the input leads of the two-transistor inverter 34a, 34b and the third common terminal 30 is attached to a second load input lead 38b.

The rectifier circuit arrangement comprises the aforementioned four diodes 10, 12, 14, 16, two capacitors 26, 28, two power input terminals 18, 20, disconnectable electrical conductor 32, and common terminal 30. The first diode 10 has an anode 40a and a cathode 40c, and diode 12 has an anode 42a and a cathode 42c, third diode 14 has an anode 44a and a cathode 44c, and fourth diode 16 has an anode 46a and a cathode 46c. The first power input terminal 18 is directly electrically connected to the anode of the first diode 40a and the cathode of the third diode 44c, and the second power input terminal 20 is electrically connected directly to the anode of the second diode 42a and to the cathode of the fourth diode 46c. The positive output terminal 22 is directly electrically connected to the first lead of the first capacitor 48 and electrically connected to the cathode of the first diode 40c and the cathode of the second diode 42c, and is electrically connected directly to the first input lead of the two-transistor inverter 34a. The negative output terminal 24 is directly electrically connected to the first lead of the second capacitor 50 and electrically connected to the anode of the third diode 44a and the anode of the fourth diode 46a and is electrically connected directly to the second input lead of the two-transistor inverter 34b. The disconnectable electrical conductor 32 is electrically connectable between the first power input terminal 18 and the second power input terminal 20. The common terminal 30 is directly electrically connected to the second lead of the first capacitor 52 and the second lead of the second capacitor 54 and is adapted to be electrically connected directly to the second load input lead 38b.

Figure 2:
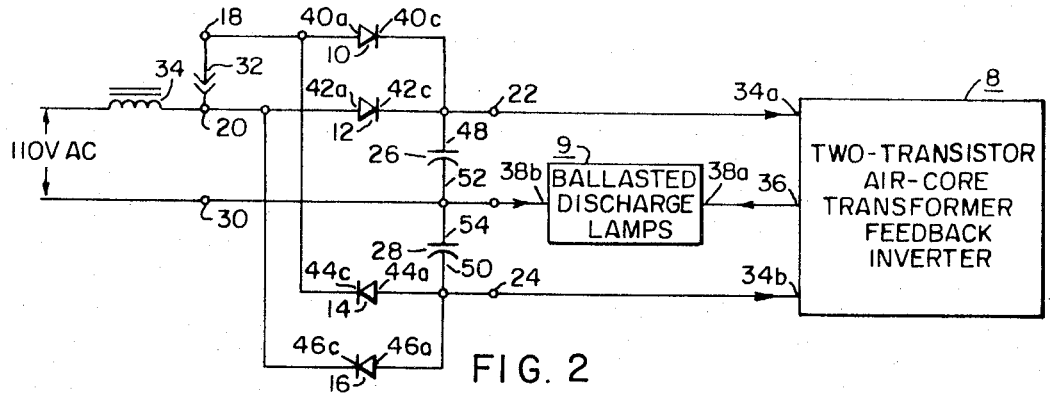
FIG. 2 shows a specific embodiment of the inductive inrush limiter and illustrates the connection of the circuit arrangement to a low-voltage power source.

With reference to FIG. 2, an arrangement is shown where the rectifier is connected to a low-voltage power source, here illustrated as a nominal 110 volt AC source. As a low-voltage power source is being used, the disconnectable electrical conductor 32 is connected. An inductive inrush limiter 34 is shown in series with one of the lines of the power source to limit the current inrush when the rectifier is initially connected and the capacitors 26, 28 are uncharged. While a resistor or a thermistor can be used in place of the inductive inrush limiter 34, the inductive inrush limiter 34 is preferred as it minimizes power losses.

Figure 3:
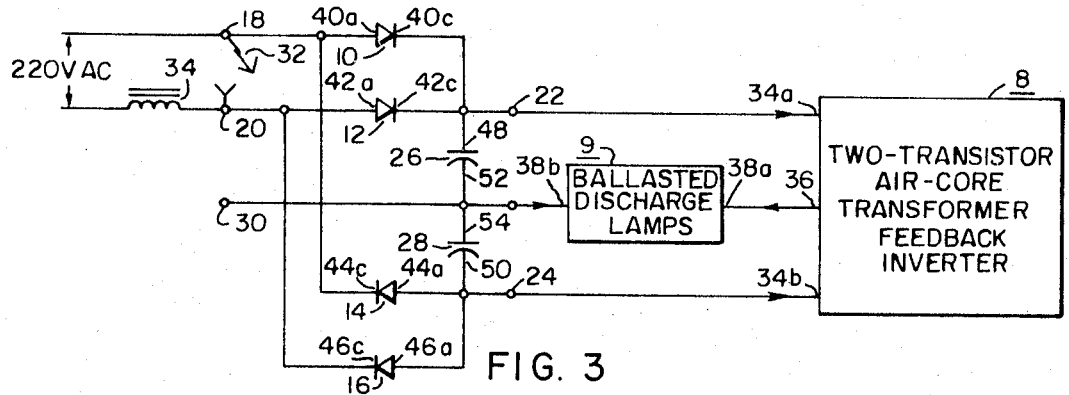
FIG. 3 shows the use of the circuit arrangement with a high-voltage power source.

With reference to FIG. 3, the circuit arrangement is shown connected in the high-voltage power source configuration, with the high-voltage power source here being 220 volts AC. In this configuration the disconnectable electric conductor 32 is disconnected. Again it is preferred that an inductive inrush limiter 34 be used in series with one of the lines of the power source. Although FIG. 2 and FIG. 3 illustrate the usage of 110 volts and 220 volts as the alternate voltage to which the circuit may be connected, other pairs of voltages in which the ratio of the voltage of the high-voltage power source to the voltage of the low-voltage power source, is about 2.6:1 to 1.5:1, for example 277 volts and 110 volts, or 440 volts and 277 volts, can be used.

Figure 4:
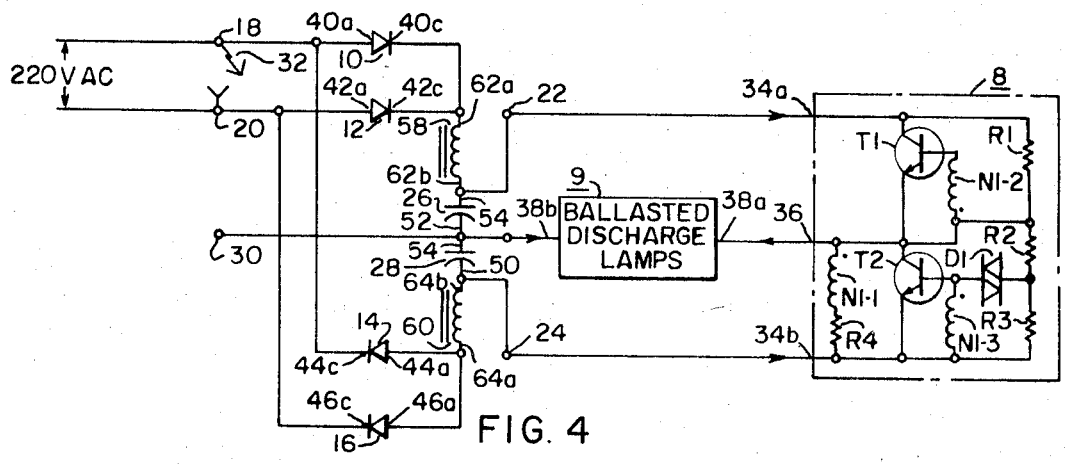
FIG. 4 shows an alternate location of an inductive inrush limiter; and shows the rectifier circuit in combination with a specific configuration of a two-transistor inverter.

With reference to FIG. 4, there is shown an alternate configuration in which two inrush limiters are used. This configuration provides an advantage when inrush limiters are to be built-in. An additional terminal would be required if the inductive inrush limiter 34 were built-in in the configuration of FIG. 3, but no additional terminal is required when the inrush limiters in the configuration of FIG. 4 are used.

In the configuration of FIG. 4 the first inductive inrush limiter 58 and second inductive inrush limiter 60 each have two leads, with the first inrush limiter 58 being connected with its first lead 62a to the cathode of the first diode 40c and the cathode of the second diode 42c and with its second lead 62b connected to the positive output terminal 22 and the first lead of the first capacitor 54. The second inductive inrush limiter 60 is connected with its first lead 64a to the anode of the third diode 44a and the anode of the fourth diode 46a and its second lead 64b connected to the negative output terminal 24 and the first lead of the second capacitor 50. While the inrush limiters could be connected in other configurations for example directly in series with the capacitors 26, 28, it is desirable that inductive limiters not be placed in the high frequency path, as even relatively small inductors can provide significant impedance at the 17 to 30 kHz frequency of the two-transistor inverter 8.

Reference is made to copending application Ser. No. 263,041 for a description of the operation of the components within the two-transistor inverter 8. In an alternate configuration of the two-transistor inverter 8 the air-core transformer feedback and its series resistor (N1–1 and R4) are connected in parallel with the ballasted discharge lamp, thus the two-transistor inverter 8 would have an additional terminal which would be connected to the common terminal 30.

What is claimed is:

1. In combination, a rectifier circuit arrangement operable from either a low-voltage or high-voltage power source for energizing a two-transistor inverter which incorporates an air-core transformer feedback, said inverter supplying high-frequency excitation to a load comprising ballasted discharge lamps, said load having a first input lead, said two-transistor inverter having first and second input leads and one output lead, and said inverter output lead being adapted to be connected to said first load input lead, said rectifier circuit arrangement comprising:
a. first, second, third and fourth diodes, each said diode having an anode and a cathode;
b. first and second capacitors, each said capacitor having a first and a second lead;
c. a first power input terminal electrically connected directly to said anode of said first diode and to said cathode of said third diode and said second power input terminal electrically connected directly to said anode of said second diode and said cathode of said fourth diode;
d. a positive output terminal electrically connected directly to said first lead of said first capacitor and electrically connected to said cathodes of said first and second diodes, and adapted to be electrically connected directly to said first input lead of said two-transistor inverter, and a negative output terminal electrically connected directly to said first lead of said second capacitor and electrically connected to said anodes of said third and fourth diodes, and adapted to be electrically connected directly to said second input lead of said two-transistor inverter;
e. a disconnectable electrical conductor which, when connected, electrically connects said first power input terminal and said second power input terminal; and
(f) a common terminal electrically connected directly to said second leads of said first and second capacitors and adapted to be electrically connected directly to said second lead of said load, said disconnectable electrical conductor and said common terminal and said input terminals being adapted to be connected in one of two arrangements;
  i. when said rectifier is operated from said low-voltage power source, said common terminal is electrically connected to one line of said low-voltage power source, and the other line of said low-voltage power source is electrically connected to either said first power input terminal or said second power input terminal, and said disconnectable electrical conductor is connected; or
  ii. when said rectifier is operated from said high-voltage power source, said first power input terminal is electrically connected to one lines of said high-voltage power source, said second power input terminal is electrically connected to the other line of said high-voltage power source, and said disconnectable electrical conductor is disconnected.

2. The combination as specified in claim 1, wherein an inductive inrush limiter is provided and is connected in series with one of said lines of said power source.

3. The combination as specified in claim 1, wherein a first and second inductive inrush limiters are used, each said inrush limiter having two leads, said first inrush limiter being connected with one lead to said cathodes of said first and second diodes and the other lead to said positive output terminal and said first lead of said first capacitor, and said second inrush limiter being connected with one lead to said anodes of said third and said fourth diodes and the other lead to said negative output terminal and said first lead of said second capacitor.

* * * * *